Oct. 10, 1967     J. BOCHAN     3,346,083
SPRING CLUTCH
Filed Dec. 1, 1965
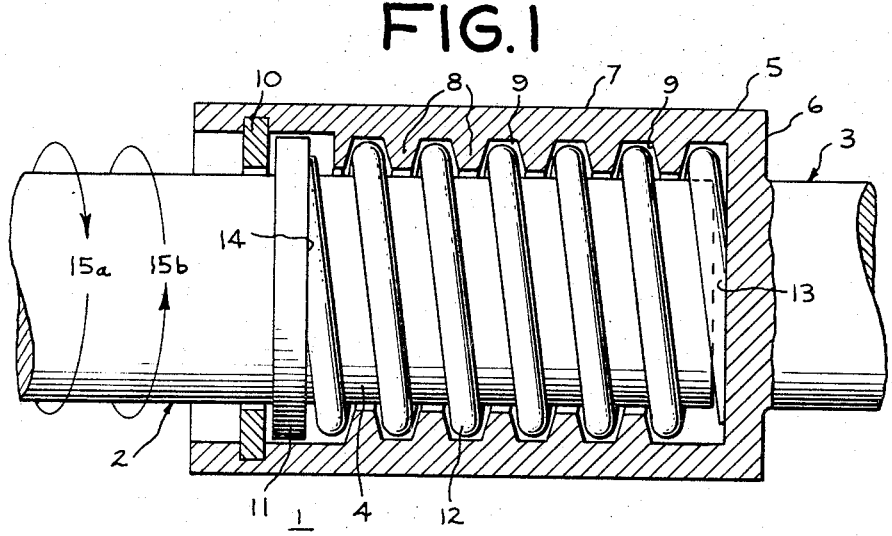
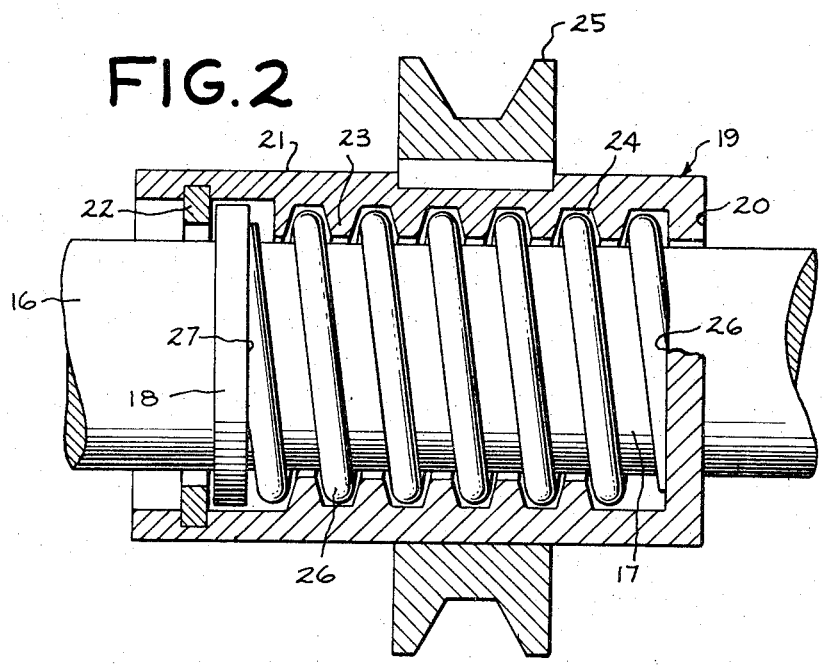
INVENTOR.
JOHN BOCHAN
BY *Radford M. Reams*
HIS ATTORNEY United States Patent Office 3,346,083
Patented Oct. 10, 1967

3,346,083
SPRING CLUTCH
John Bochan, Louisville, Ky., assignor to General Electric Company, a corporation of New York
Filed Dec. 1, 1965, Ser. No. 510,793
6 Claims. (Cl. 192—81)

ABSTRACT OF THE DISCLOSURE

A wound spring clutch for concentrically disposed input and output members having a shoulder and thrust bearing arrangement. One member is internally threaded and an open-coil helical spring is mounted on the other member in register with the thread. Thus rotation of the input member in the proper direction causes relative movement of the members to bring the shoulder and thrust bearing into driving engagement while the spring slips in the other direction of rotation.

Background of the invention

Coil-spring type clutches have come into widespread use. In the most usual type of application coaxial input and output members are placed in end-to-end juxtaposition and a coil-spring is mounted around the abutting ends. When the input member is rotated in one direction it tends to cause the spring to unwind (expand radially) so that the input member will slip within the spring without any appreciable torque being transmitted to the output member. When the input member is rotated in the other direction it tends to cause the spring to contract so that the spring firmly engages or seizes upon both members. This causes the output member to be rotated with the input member.

It often happens that the members will move apart during operation, creating what is known as a cross-over gap. When this occurs, all of the torque being transmitted is applied to that portion of the spring which spans the cross-over gap and may cause the spring to fail. It also may cause the spring to rub the edges of the members so that the various components will be scored or roughened. This changes the coefficients of friction involved and may result in erratic future operation. Also, part of the spring may be forced into the cross-over gap so that, when the members move together again, the spring will be crushed.

Some coil-spring clutches incorporate input and output members having juxtaposed, hollow, cup-shaped ends with the coil-spring mounted within the cups. Such mechanisms involve all the problems incident to a cross-over gap situation.

Other spring clutches have one member mounted around and radially spaced from the other member. In these mechanisms the spring is mounted in sliding engagement with one of the members and firmly attached to the other by a tab formed from one end of the spring. With such mechanisms all of the torque transmitted is applied to the tab, which often fails.

It is an object of this invention to provide an improved coil-spring clutch which solves these and other problems of the spring clutch art.

Another object of this invention is to provide an improved coil-spring clutch which is effective without using a projecting tab and, at the same time, eliminates the cross-over gap.

Summary of the invention

In carrying out my invention, in one form thereof, I provide a spring clutch including a rotary input member and a rotary output member. The output member includes a base portion and a hollow, cylindrical portion mounted around the input member. A thrust bearing is mounted on the output member at the end remote from the base portion and a shoulder is formed on the input member so that the bearing and shoulder selectively may be brought into frictional engagement. The output member is internally threaded and an open-coil helical spring is mounted on the input member and received within thread of the output member. The ends of the spring are flattened and each end is in sliding engagement with the corresponding one of the base portion and the shoulder.

When the input member is rotated in a first direction it tends to cause the spring to expand radially so that the input member slips within the spring. Rotation of the input member in the other direction causes the spring to contract radially so as to firmly engage and rotate with the input member. The spring then engages the thread on the output member, and causes relative motion of the input and output members thus causing the bearing and shoulder to be engaged. Torque then is transferred from the input member to the output member through the engagement of the shoulder and bearing as well as through the spring.

The subject which I regard as my invention is particularly pointed out and distinctly claimed in the concluding portion of the specification. My invention, however, both as to organization and method of operation, together with further objects and advantages thereof, may best be understood by reference to the following description taken in conjunction with the accompanying drawing.

Brief description of the drawing

FIGURE 1 is a longitudinal view of a coil-spring clutch constructed in accordance with one embodiment of my invention; the view being partly broken away and partly in section to illustrate details; and FIGURE 2 is a longitudinal view similar to FIGURE 1, showing another embodiment of my invention.

Description of preferred embodiments

Referring now to FIGURE 1, there is shown a spring clutch 1 including a rotary input member 2 and a rotary output member 3. The end portion 4 of the input member is formed with a smooth, generally cylindrical configuration. The end 5 of the output member is cup-shaped having a base portion 6 and a hollow cylindrical portion 7 extending around and spaced from the end portion 4 of the input member. The input member 2, the main portion of the output member 3 and the hollow cylindrical portion 7 of the output member 3 are all generally coaxial. The cylindrical portion 7 is internally threaded to provide a helically disposed land and groove arrangement including a helical land 8 and adjacent helical groove 9.

A thrust bearing 10 is mounted on the inside of the cylindrical portion 7 adjacent its end opposite the base portion 6 and a shoulder 11 is formed on the input member 2 so that the shoulder and thrust bearing will come into frictional engagement when the input and output members are moved relatively in such a manner as to tend to cause end portion 4 of input member to be removed from within cylindrical portion 7 of output member 3.

An open coil helical spring 12 is mounted on the end 4 of input member 2 and is received in the groove 9 in the output member 3. The ends of the spring are beveled as indicated at 13 and 14 and these beveled ends slidably engage the inner surface of the base portion 6 and shoulder 11 respectively.

With this construction, when the input member 2 is rotated in a first direction, as indicated by arrow 15a, a frictional force is exerted on spring 12 and causes it to tend to unwind (or expand radially). Thus, the input member will turn without transmitting any appreciable torque to the output member. When the input member is rotated in the other direction, as indicated by arrow 15b, the friction force on the spring 12 will cause it to contract radially so that it firmly engages or seizes upon the end portion 4. The input member 2 and spring 12 tend to act as a screw and move the input member relative to the output member 3 in such a manner as to remove the end portion 4 from within the cylindrical portion 7. This movement quickly causes the shoulder 11 to engage the thrust bearing 10 so that the output member 3 is rotated with the input member. Torque then is transmitted from the input member to the output member through the engagement between shoulder 11 and the thrust bearing 10 as well as the engagement of the spring 12 with the side of the land 8.

FIGURE 2 shows another embodiment of my new and improved spring clutch which is essentially similar to the embodiment of FIGURE 1. In the clutch of FIGURE 2, the input member 16 includes a smooth, generally cylindrical intermediate portion 17 having a shoulder 18 formed at one end thereof. A cup-shaped output member 19 is mounted around the intermediate portion 17 of the input member and includes a base portion 20 and a hollow, cylindrical portion 21 extending around the intermediate portion 17 of input member 16. A thrust bearing 22 is mounted adjacent the end of the cylindrical portion 21 remote from the base portion 20. The hollow cylindrical portion 21 is internally threaded so as to provide a helically disposed land and groove arrangement including a land 23 and a groove 24. Some means such as the belt-type pulley 25 is mounted around the outside of cylindrical portion 21 to rotate therewith and transmit torque and motion from the output member. An open-coil helical spring 26 is mounted on the intermediate portion 17 of input member 16 and is received within the groove 24 of output member 19. The ends of the spring are beveled as indicated at 27 and 28 to form flattened portions for sliding engagement with shoulder 18 and base portion 20 respectively.

As with the spring clutch shown in FIGURE 1, rotation of input member 16 in a first direction causes the spring to expand so that the input member slips within the spring without transmitting any appreciable torque to the output member. On the other hand, rotation of the input member 16 in the other direction causes the spring to contract and seize upon the intermediate portion 17 so that the input member, spring and output member are effectively locked together for simultaneous rotation with the torque being transmitted from the input member to the output member through the shoulder 18 and thrust bearing 22 as well as between the spring 26 and the side of the land 23.

Since a belt associated with the belt pulley 25 must be tight in order to transmit torque without slipping, the output member 19 will be pulled against the intermediate portion 17 of the input member. In order to prevent this engagement from interfering with proper clutch operation, the output member 19 is formed from a suitable material such as oil impregnated bronze. Also, the thrust bearing 22 extends radially inwardly a distance sufficiently less than the land 23 and base 20 to insure that it does not come into contact with a shaft 16 in any manner other than by frictional engagement with the shoulder 18. Of course, other arrangements could be provided such as, for instance, incorporating a separate low friction bearing at each end of the output member 19 to support the output member on the input member 16.

If the application of my new and improved clutch is such as to make a grease packed construction desirable, either of the embodiments may be packed with grease between the input member and the cylindrical portion of the output member. If grease is used, it may be desirable to employ a lip seal adjacent the thrust bearing in both embodiments and adjacent the base 20 in the embodiment of FIGURE 2.

While in accordance with the patent statutes I have described what at present are considered to be the preferred embodiments of my invention, it will be obvious to those skilled in the art that various changes and modifications may be made therein without departing from the invention, and I therefore aim in the appended claims to cover all such changes and modifications as fall within the true spirit and scope of my invention.

What I claim as new and desire to secure by Letters Patent of the United States is:

1. In a spring clutch:
   (a) a rotary input member,
   (b) a rotary output member including a hollow, cylindrical portion mounted around said input member, said cylindrical portion being internally threaded;
   (c) a thrust bearing mounted on one of said members and a shoulder formed on the other of said members, said shoulder and said bearing being adapted selectively for engagement;
   (d) and an open-coil helical spring mounted on said input member and received within the thread of said output member;
   (e) rotation of said input member in a first direction tending to cause said spring to expand radially so that said input member slips within said spring, while rotation of said input member in the other direction causes said spring to contract radially so as to firmly engage and rotate with said input member, said spring then engaging said thread to cause relative movement between said input member and said output member so as to cause engagement between said shoulder and said thrust bearing.

2. A spring clutch as set forth in claim 1 wherein each end of said spring is provided with a flattened portion and each of said members is provided with a smooth surface adapted for sliding engagement with an associated one of said flattened portions.

3. In a spring clutch:
   (a) a rotary input member,
   (b) a rotary cup shaped output member including a base portion and a hollow, cylindrical portion extending around said input member, said cylindrical portion being internally threaded;
   (c) a thrust bearing mounted on the inside of said output member adjacent the end of the threads remote from said base portion;
   (d) a shoulder formed on said input member and adapted for engagement with said bearing;
   (e) and an open-coil helical spring mounted on said input member and received within the thread of said output member;
   (f) rotation of said input member in a first direction tending to cause said spring to expand radially so that said input member slips within said spring, while rotation of said input member in the other direction causes said spring to contract radially and rotate with said input member, said spring then engaging said thread to cause relative movement between said input member and said output member so as to cause engagement between said shoulder and said thrust bearing.

4. A spring clutch as set forth in claim 3 wherein each end of said spring is provided with a flattened portion, one of said flattened portions slidably engaging said shoulder of said input member and the other of said flattened portions slidably engaging said base portion of said output member.

5. In a spring clutch:
   (a) a rotary input member,
   (b) a rotary cup shaped output member including a base portion and a hollow, cylindrical portion extending around the outside of said input member;

(c) said cylindrical portion being internally threaded to provide a helically disposed land and groove arrangement, the inner surface of said land being formed from a low friction bearing material,
(d) a thrust bearing mounted on the inside of said output member adjacent the end of the threads remote from said base portion;
(e) a shoulder formed on said input member and adapted for engagement with said bearing;
(f) and an open-coil helical spring mounted on said input member and received in the groove on said output member;
(g) rotation of said input member in a first direction tending to cause said spring to expand radially so that said input members slips within said spring, while rotation of said input member in the other direction causes said spring to contract radially and rotate with said input member, said spring then engaging said thread to cause relative movement between said input member and said output member so as to cause engagement between said shoulder and said thrust bearing.

6. A spring clutch as set forth in claim 5 wherein each end of said spring is provided with a flattened portion, one of said flattened portions slidably engaging said shoulder of said input member and the other of said flattened portions slidably engaging said base portion of said output member.

References Cited

UNITED STATES PATENTS

| | | | |
|---|---|---|---|
| 1,725,109 | 8/1929 | Starkey | 192—41 |
| 2,092,613 | 9/1937 | Olley | 64—27 |
| 2,231,037 | 2/1941 | Taylor | 64—27 |
| 2,242,379 | 5/1941 | Wahl. | |
| 2,895,578 | 7/1959 | Winchell | 192—41 |

MARK M. NEWMAN, *Primary Examiner.*

ARTHUR T. McKEON, *Examiner.*